United States Patent [19]

Low et al.

[11] 3,857,045

[45] Dec. 24, 1974

[54] FOUR-PHASE LOGIC SYSTEMS

[76] Inventors: George M. Low, Administrator of the National Aeronautics and Space Administration, with respect to an invention of; Howard L. Petersen, 13192 Paramount Drive, Saratoga; Donald K. Kinell, 2420 Whitney Drive, Mountain View, both of Calif.

[22] Filed: Apr. 17, 1973

[21] Appl. No.: 351,929

[52] U.S. Cl. .................................. 307/208, 307/205

[51] Int. Cl. .............................................. H03k 3/64

[58] Field of Search ............................. 307/205, 208

[56] References Cited

UNITED STATES PATENTS

| | | | |
|---|---|---|---|
| 3,252,011 | 5/1966 | Zuk | 307/208 |
| 3,497,715 | 2/1970 | Yen | 307/205 |
| 3,551,693 | 12/1970 | Burns | 307/205 |
| 3,676,709 | 7/1972 | Ducamus et al. | 307/205 X |
| 3,708,688 | 1/1973 | Yao | 307/208 X |

*Primary Examiner*—John S. Heyman

*Attorney, Agent, or Firm*—Marvin J. Marnock; Marvin F. Matthews; John R. Manning

[57] ABSTRACT

A four-phase logic system is provided which includes at least four logic networks connected in parallel between a single power line and a reference potential. A four-phase clock generator generates four distinct clock signals from a single-phase clock input at data rate. Each logic network comprises a pair of complementary metal-oxide-semiconductor integrated transistors (CMOST). Each metal-oxide-semiconductor transistor (MOST) in the pair is responsive to a clock signal which turns the transistor ON or OFF. In each network there is also at least one MOST which is responsive to a logic signal. The logic transistor is connected in cascade with the pair of CMOSTs. A stray capacitance which serves as a storage capacitor between the junction of the pair of transistors and a reference potential provides an output signal dependent upon the applied clock signals and the incoming logic signal.

3 Claims, 11 Drawing Figures

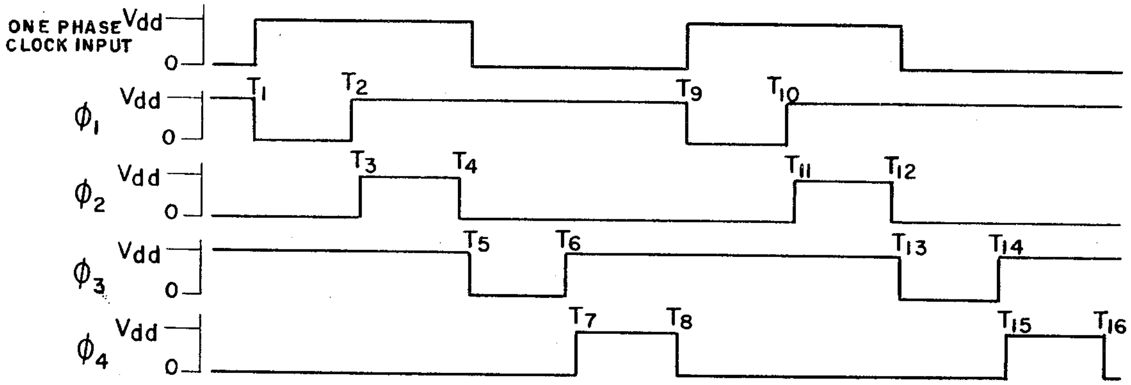
FIG. 4.
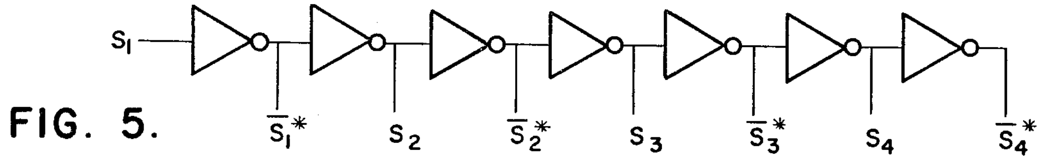
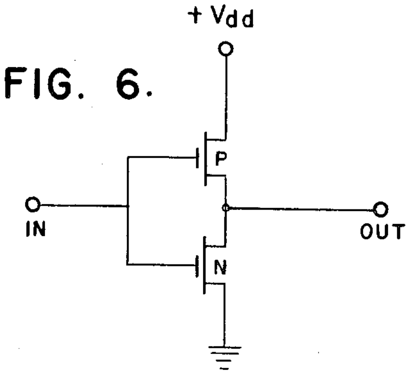
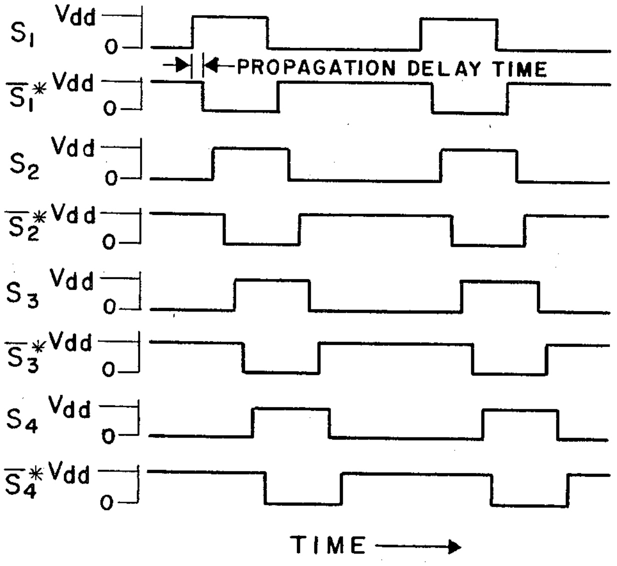
FIG. 7.
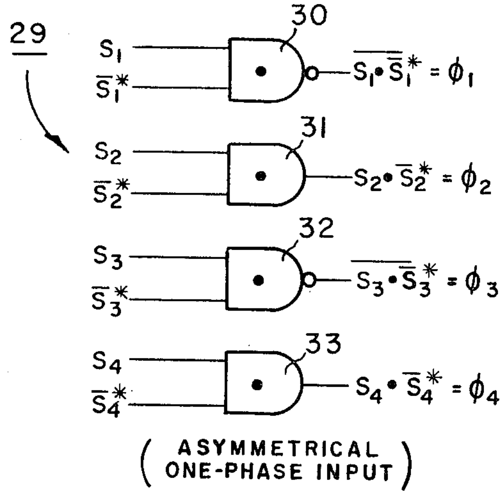
FIG. 8.

FOUR-PHASE LOGIC SYSTEMS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

MOST integrated micro circuits are highly desirable because they allow high-component packing density on a single chip. P-channel, MOST, four-phase logic networks are known. Such prior art four-phase logic networks require for their operation a four-phase clock generator driven by at least two, single-phase, clock signals at the data rate. Consequently, such prior art four-phase circuits cannot be used as sub-assemblies in such logic systems which cannot accommodate a four-phase clock generator requiring two or more clock inputs. Known, P-channel, four-phase logic circuits also have the further disadvantage of requiring two distinct power supply voltages. Since bi-polar logic employs only a single supply voltage, it is apparent that the requirement for two power supply voltages makes it rather difficult to interface conventional bi-polar logic systems with four-phase logic systems.

It is therefore an object of the present invention to overcome the above-described and other apparent drawbacks of known four-phase MOST logic systems.

SUMMARY OF THE INVENTION

The objects of the invention are accomplished by generating the required four-phase on a single chip from a single phase clock at the data rate. Accordingly, this invention makes possible CMOST logic implementation with a single standard bi-polar logic voltage supply. Hence, the invention can be easily interfaced with bi-polar logic, MOST static logic, and MOST two-phase logic. The invention can also be used to replace directly logic sub-assemblies in systems designed for other logic types. In the invention, the CMOST semiconductor devices act as switches to charge and discharge their storage capacitors in the desired sequence of operation.

In a preferred embodiment, the four-phase logic system itself includes at least four logic networks connected in parallel between a single power line and a reference potential. A four-phase clock generator generates four distinct clock signals from a single-phase clock input at data rate. Each logic network comprises a pair of CMOSTs. Each MOST in the pair is responsive to a clock signal which turns it ON or OFF. In each network there is also at least one additional logic MOST, responsive to a logic signal, which is connected in cascade with the pair of CMOSTs. A storage capacitance between the junction of the pair of CMOSTs and a reference potential provides an output signal dependent upon the applied clock signals and the incoming logic signal.

BRIEF DESCRIPTION OF THE DRAWINGS

FIG. 4 represents typical wave forms of the four phases obtained from the generator of FIG. 3;

FIG. 5 shows a preferred embodiment of a clock generator for producing the desired phases;

FIG. 6 shows a typical CMOST inverter of a type which can be used in the generator shown in FIG. 5;

FIG. 7 depicts the input and output waveforms of the generator shown in FIG. 5;

FIG. 8 is a logic gate network with the generator shown in FIG. 5 for producing the desired phase signals from the clock signals;

Referring now to FIG. 1, there is shown a four-phase logic system employing MOSTs and CMOSTs. The four phases or clock pulses are herein referred to as the $\phi_1$, $\phi_2$, $\phi_3$, and $\phi_4$ phases. The present invention is particularly concerned with a system 10 using four basic logic networks or elements 12–15, each logic element employing a pair of opposite polarity MOST's known as P-channel and N-channel. Networks 12–15 are herein referred to as TYPES 1–4, respectively. Each of the logic elements 12–15 comprises at least three MOSTs $Q_1$–$Q_3$, and each logic element stores its information in the stray capacitances of the MOSTs which are lumped for the sake of the drawing into a single storage capacitor designated as C and followed by an appropriate subscript corresponding to the number of the particular TYPE of logic element.

Logic systems of the kind to which this invention relates are particularly adapted for integrated circuits in which a considerable number of logic functions can be performed by a single integrated circuit unit or chip. As previously mentioned, this invention makes it possible to provide four-phase logic systems on single chips and such chips can then be interconnected with different kinds of logic elements or systems mounted on other chips in which capacitors are used as the memory storage elements.

Each logic TYPE comprises a logic MOST connected in series with a pair of MOSTs of opposite polarity, that is with a pair of complementary MOSTs herein called CMOSTs. Each CMOST receives one clock pulse or phase and each consecutive pair of CMOST's receives the same phase. As previously mentioned, there are four phases $\phi_1$–$\phi_4$, and the junction between the two CMOSTs can provide on an output lead an output pulse for each logic TYPE. The stray capacitance of the chip between the output lead and ground store the logic information in the logic TYPE.

More specifically, TYPE 2 logic element comprises in a simplified embodiment three MOSTs $Q_1$–$Q_3$ with $Q_2$–$Q_3$ forming the CMOST pair and $Q_1$ receiving a LOGIC$_2$ input at 9. The TYPE 2 logic element is connected between a reference potential 2, typically ground, and a power supply BUS 7 maintained at $+V_{dd}$. The stray capacitance 8 is represented as a capacitor $C_2$ connected between ground and the output lead OUT$_2$, at the junction of the CMOST pair. MOST $Q_2$ receives a phase or clock pulse $\phi 2$ at 4 and MOST $Q_3$ receives a clock $\phi_1$ at 3.

The TYPE 3 logic element similarly includes three MOSTs $Q_4$–$Q_6$ with the logic receiving MOST being $Q_6$. It will be noted that $Q_4$ in TYPE 2 and $Q_2$ in TYPE 3 receive the same clock $\phi_2$. In the TYPE 4 logic element, the logic receiving MOST is $Q_7$, and in the TYPE 1 the logic receiving MOST is $Q_{12}$. With one logic receiving MOST, a logic input A becomes an output $\bar{A}$.

Figure 2:
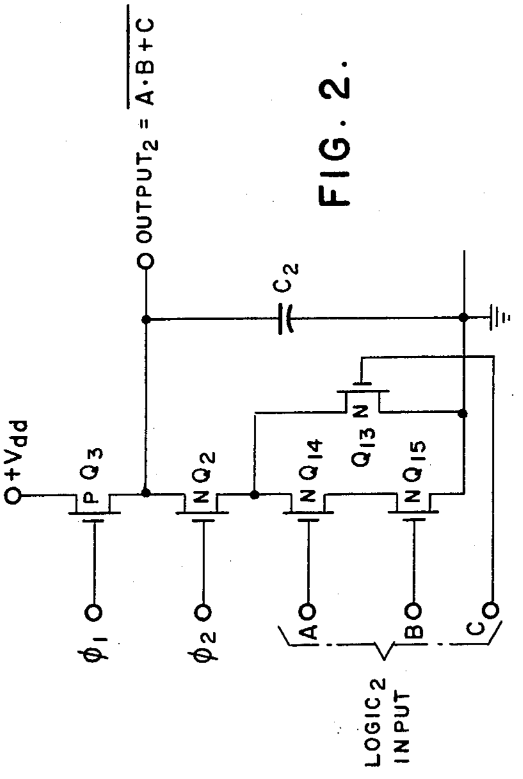
FIG. 2 shows a modified embodiment of a logic network.

In FIG. 2 is shown a variation of the TYPE 2 logic element in which three transitors $Q_{13}$–$Q_{15}$ are substituted for the single logic transitor $Q_1$. Transitors $Q_{13}$–$Q_{15}$ respectively receive logic inputs C, A, and B and provide an output $\overline{AB+C}$. It will therefore be apparent that more than three MOSTs can substitute for each logic transistor to accommodate more complex logic inputs.

Figure 1:
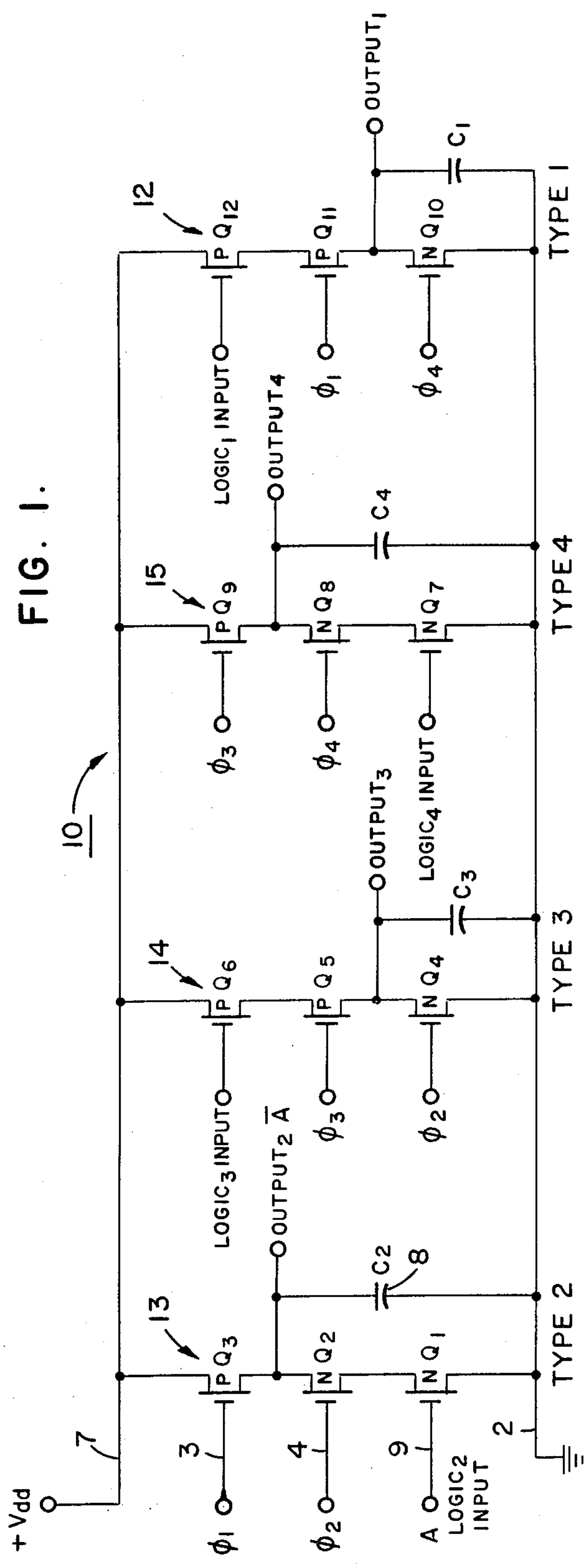
FIG. 1 shows a four-phase logic system including four distinct types of logic networks.
Figure 3:
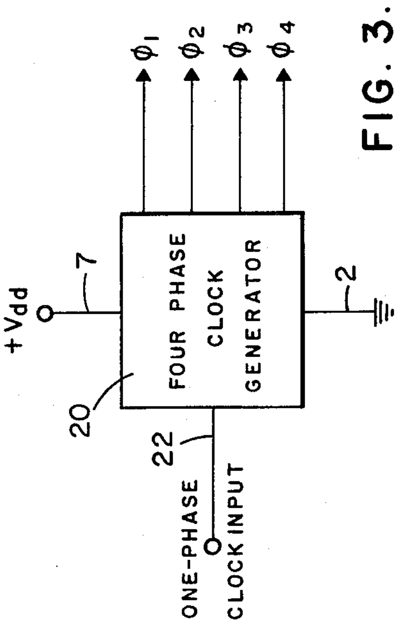
FIG. 3 is a block representation of a four-phase clock generator.

Referring now to FIGS. 3 and 4, there is shown a four-phase clock generator 20 receiving a one-phase clock input on line 22 and providing four output clocks or phases $\phi_1$–$\phi_4$ such as are needed for the logic system 10 of the invention shown in FIG. 1. A one-phase clock input is illustrated in FIG. 4 as being a repetitive rectangular wave which starts at $T_1$. The clock $\phi_1$ is at the supply potential at time $T_1$ at which time it changes to zero potential and remains at zero potential until time $T_2$ at which time it returns and remains at the supply potential for the duration of the period of the one-phase clock input. The clocks $\phi_2$–$\phi_4$ relative to the clock $\phi_1$ are depicted in FIG. 4. The width of each clock is such as to allow sufficient time for charging and discharging of capacitors $C_1$–$C_4$ (FIG. 1). The total width of all four clocks in the time domain is less than the time period of the one-phase clock input on line 22. Also the clock pulses are displaced in the time domain so as not to overlap. It should now be apparent that since the four required phases are generated from a single one-phase clock input, the clock generator 20 and the four-phase logic system 10 can be fabricated on a single chip.

In FIG. 5 are shown seven CMOST inverters connected in cascade. The input signal is designated as $S_1$ and each output signal is designated with an appropriate subscript to indicate its position in the chain. An asterisk following an output designates that the output is not a true inverse of the input but is delayed therefrom by a finite time interval which depends on the particular inverter's propagation characteristics.

FIG. 6 shows a typical CMOST inverter of a type which can be used to form the cascade of inverters shown in FIG. 5.

The preferred circuit used in the four-phase clock generator 20 will now be described with reference to FIGS. 5–9.

In FIG. 7 are represented the input waveform $S_1$ and the resulting output waveforms $\overline{S_1}^* - \overline{S_4}^*$ obtained from the series of inverters shown in FIG. 5.

To obtain the desired clock signals, the input and the output pulses from the inverters of FIG. 5 are applied to a gate network 29 comprising four logic gates 30–33 including a pair of AND gates and a pair of NAND gates, as shown in FIG. 8.

Figure 9:
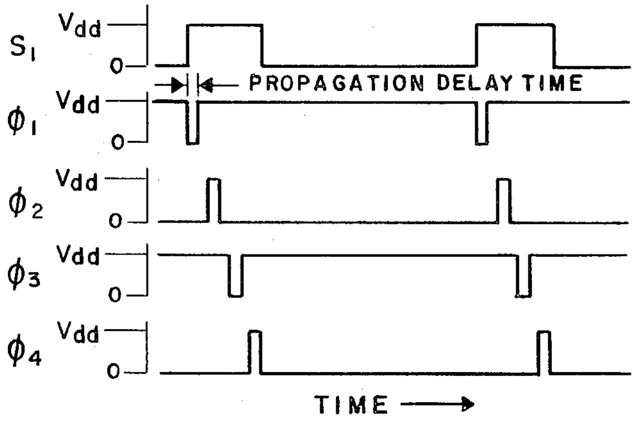
FIG. 9 depicts the input and output waveforms from the gate network shown in FIG. 8.

FIG. 9 represents the output waveforms from and the input waveforms $S_1$ into gate network 29. It will be noted that the input waveform $S_1$ is an asymmetrical one-phase input clock.

Figure 11:
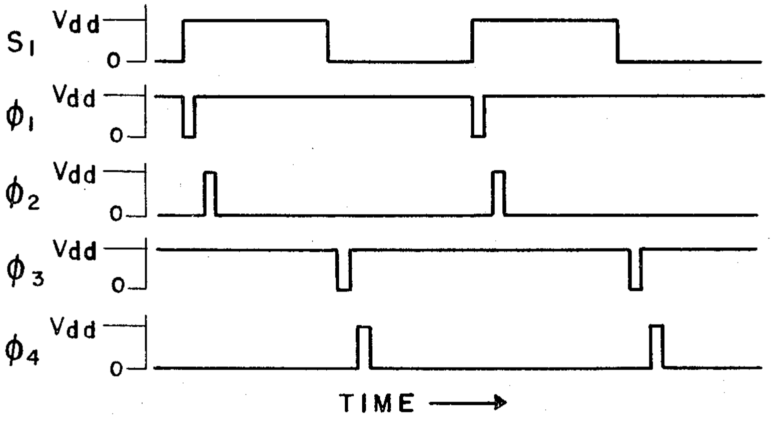
FIGS. 10 and 11 are, respectively, similar to FIGS. 8 and 9 but for a different input clock signal.
Figure 10:
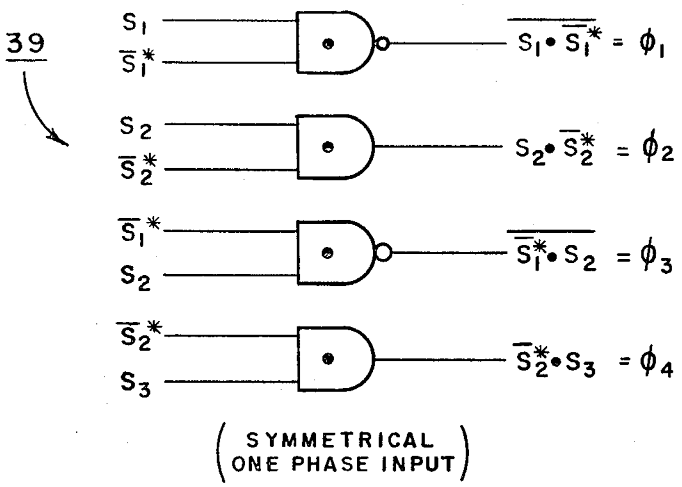

FIGS. 10 and 11 are similar to FIGS. 8 and 9, respectively, except that the input clock signal is a symmetrical one-phase clock. It will be noted from a consideration of the inputs to the gate network 39, shown in FIG. 10, that in the case of a symmetrical one-phase input clock, only four CMOST inverter stages are required instead of the minimum seven such stages previously specified for the case of an asymmetrical one-phase input clock, as shown in FIG. 5.

After having explained the manner of constructing the four-phase clock generator 20 (FIG. 2) on the same chip with the logic system 10 (FIG. 1), there will now be described the operation of system 10 together with the waveforms depicted in FIG. 4.

Capacitor $C_2$ is charged and discharged through CMOSTs $Q_2$–$Q_3$. During time interval $T_1$–$T_2$, the application of clock $\phi_1$ causes $Q_3$ to switch ON since $\phi_1$ is at ground potential, while $Q_2$ remains OFF. Capacitor $C_2$ charges to the supply potential $V_{dd}$ through MOST $Q_3$. After time $T_2$, MOST $Q_3$ is switched OFF by $\phi_1$ and capacitor $C_2$ stores its potential. During time interval $T_3$–$T_4$, is switched ON by $\phi_2$. Depending on the $LOGIC_2$ input, MOST $Q_1$ will be switched either ON or OFF. If the logic input is a ONE, $Q_1$ will turn ON thereby completing a path to ground through $Q_2$, and capacitor $C_2$ will discharge to ground potential. On the other hand, if the logic input is a ZERO, $Q_1$ will switch OFF, and $C_2$ will remain charged. The stored information in capacitor $C_2$ is available for readout from time $T_4$ to time $T_9$.

Thus it will be appreciated that $C_2$ in the TYPE 2 logic element is precharged during clock $\phi_1$; it is evaluated, that as it can be modified or allowed to remain the same during clock $\phi_2$, and it is available for readout during $\phi_3$ and $\phi_4$. $C_2$ will again be precharged at the next $\phi_1$, etc. It can be stated therefore that the TYPE 2 logic element operates as an inverter which is precharged during time interval $T_1$–$T_2$, evaluated during interval $T_3$–$T_4$, and valid during interval $T_4$–$T_9$.

The TYPE 3 logic element operates in a similar manner: capacitance $C_3$ is charged and discharged through CMOSTs $Q_4$–$Q_5$ during time interval $T_3$–$T_4$, $Q_4$ is switched ON by $\phi_2$ at $+V_{dd}$, while $Q_5$ remains OFF since $\phi_3$ is also at $+V_{dd}$. Thus $C_3$ is charged to ground potential.

After time $T_4$, $Q_4$ is switched OFF and $C_3$ stores its ground potential. During time interval $T_5$–$T_6$, $Q_5$ is switched ON by $\phi_3$ at ground potential. Depending on the $LOGIC_3$ input to $Q_6$, $C_3$ will remain at ground potential for a ONE input which effectively holds $Q_6$ OFF, or $C_3$ will charge to $+V_{dd}$ for a ZERO logic input which turns $Q_6$ ON and completes a path to $+V_{dd}$ through $Q_5$ and $Q_6$.

The potential on $C_3$ provides $OUTPUT_3$, and from time interval $T_6$–$T_{11}$ both $Q_4$ and $Q_5$ are OFF, thereby isolating the information on $C_3$. $OUTPUT_3$ is valid for readout during $T_6$–$T_{11}$. Thus, the TYPE 3 network also operates as an inverter which is precharged during interval $T_3$–$T_4$, evaluated during interval $T_5$–$T_6$, and valid during interval $T_6$–$T_{11}$.

It will be noted that the TYPE 4 logic element is similar to the TYPE 2 logic element. The TYPE 4 logic element operates as an inverter which is precharged during time interval $T_5$–$T_6$, evaluated during interval $T_7$–$T_8$, and valid during interval $T_8$–$T_{13}$. It will also be noted that the TYPE 1 and TYPE 3 logic elements are similar. TYPE 1 operates as an inverter which is precharged during interval $T_7$–$T_8$, evaluated during interval $T_9$–$T_{10}$, and valid during interval $T_{10}$–$T_{15}$.

While the logic networks 12–15 shown in FIG. 1 operate as simple inverters, they are also capable of performing more complex logic functions by replacing the single logic MOST such as $Q_1$ or $Q_6$, etc., in each of logic networks 12–15 with a more complex MOST logic circuit, for example as depicted in FIG. 2, wherein is shown a TYPE 2 logic element for generating an output $\overline{AB+C}$.

As shown in FIG. 2, $C_2$ is charged to the supply voltage $V_{dd}$ during the time interval $T_1$–$T_2$. Depending on the state of the logic inputs A, B and C during time interval $T_3$–$T_4$, $Q_{13}$, $Q_{14}$, and $Q_{15}$ will be switched either ON or OFF. To discharge $C_2$, either $Q_{13}$ alone must be ON or $Q_{14}$ in series with $Q_{15}$ must be ON. All three MOST's $Q_{13}$–$Q_{15}$ are operative during the evaluation interval $T_3$–$T_4$ when $Q_2$ is ON. In sum, capacitor $C_2$ discharges for AB+C and a ZERO output represents the complement of AB+C that is $\overline{AB+C}$.

Other logic functions may be synthesized using combinations of MOSTs as necessary. It will be noted that the combination shown in FIG. 2 produces the NOR function as well as the NAND function. Extensions of the simple circuit of FIG. 2 can produce most logic functions which may be desired in practice.

It will be appreciated that in using complementary MOST four-phase logic, successive phase intervals are used to precharge and evaluate a logic element TYPE. The output of a particular logic element TYPE is valid for the next two clocks. The clocks are so arranged that only one logic element is evaluated during each phase. The TYPE 1 logic element is evaluated during $\phi_1$, TYPE 2 during $\phi_2$, TYPE 3 during $\phi_3$, and TYPE 4 during $\phi_4$.

Thus the output of a specified logic element TYPE can be applied to the inputs of two logic element TYPES. For example, a TYPE 1 logic element can be used to provide an input to a TYPE 2 or a TYPE 3 logic element. A TYPE 2 can be used to provide an input to a TYPE 3 or a TYPE 4. A TYPE 3 can be used to provide an input to a TYPE 4 or a TYPE 1, and a TYPE 4 can be used to provide an input to a TYPE 1 or a TYPE 2.

Referring to the operation of the inverter network shown in FIG. 5 and the phase generating logic of FIG. 8 and for an asymmetrical 1-phase input clock $S_1$, $\phi_1$ is generated from this single phase input by the logic function $\phi_1 = \overline{S_1 \overline{S_1}^*}$ where $S_1$ and $\overline{S_1}^*$ are slightly delayed by the propagation time of the inventor. Clock $\phi_1$ is false only if both $S_1$ and $\overline{S_1}^*$ are true, a condition which exists only during the delay interval after $S_1$ becomes true. Similarly, $\phi_2 = S_2\overline{S_2}^*$ and is true only during the delay interval after $S_2$ becomes true. Similarly, $\phi_3$ is false only during the delay interval after $S_3$ becomes true, and $\phi_4$ is true only during the delay interval after $S_4$ becomes true. FIG. 9 shows the waveforms of the input and outputs.

For a symmetrical one-phase input clock and the phase generating logic as shown in FIG. 10, the logic functions for $\phi_1$ and $\phi_2$ are the same as previously described. However, $\phi_3$ and $\phi_4$ are now generated for the other half cycle of the one-phase input by functions $\phi_3 = \overline{S_1^* S_2}$ and $\phi_4 = \overline{S_2} S_3$.

In this case, $\phi_3$ is false only for the delay interval after $\overline{S_2}^*$ becomes true. Also, $\phi_4$ is true only for the delay interval after $\overline{S_2}^*$ becomes true. FIG. 11 shows the waveforms of the input and output for the symmetrical one-phase input.

It will be appreciated that the above described embodiments are for specific logic implementation and are only illustrative of the principles of the invention. Persons skilled in the art may effect various modifications without departing from the spirit and scope of the invention as defined in the claims attached hereto.

What is claimed is:

1. A four-phase logic system comprising:

at least four logic networks connected in parallel between a voltage source and a reference potential;

each said logic network including a pair of CMOSTS, and a logic MOST circuit connected in series with the pair of CMOSTS, and wherein each said pair comprises a P type conductivity transistor and an N type conductivity transistor with their conductive paths in series connection adjacent series CMOST pairs and logic MOSTS alternating in position in said series between said voltage source and said reference potential, a four-phase clock generator adapted to generate a four-phase clock waveform signal from a single phase input clock waveform signal, each said CMOST in each pair of CMOSTS being respectively coupled to adjacent phases of said clock generator which turns it ON and OFF.

each said logic MOST circuit being responsive to a logic input signal, and each junction terminal between each pair of CMOSTS constituting an output terminal for its associated logic network with the stray capacitance between said junction terminal and the reference potential constituting a storage means for storing the desired logic output of said associated logic network where it is available for readout from said output terminal.

2. A four-phase logic system as defined in claim 1 wherein first and second phases of said clock generator output are coupled to different control electrodes of the pair of said CMOSTS in the first of said logic networks, second and third phases of said clock generator output are coupled to different control electrodes of the pair of said CMOSTS in the second of said logic networks, third and fourth phases of said clock generator output are coupled to different control electrodes of the pair of said CMOSTS in the third of said logic networks, and said first and fourth phases of said clock generator output are coupled to different control electrodes of the pair of said CMOSTS in the fourth of said logic networks.

3. A four-phase logic system as defined in claim 2 wherein an electrode of the serially connected pair of CMOSTS of said first logic network and said third logic network are coupled directly to said voltage source in a conductive path therewith and said voltage source is coupled directly to an electrode in the conductive path of a logic MOST in the logic MOST circuit of said second logic network and to an electrode in the conductive path of the logic MOST circuit of said fourth logic network.

* * * * *